(12) United States Patent
Wang et al.

(10) Patent No.: US 10,959,309 B2
(45) Date of Patent: Mar. 23, 2021

(54) LED LAMP PROTECTION CIRCUIT

(71) Applicant: Current Lighting Solutions, LLC, East Cleveland, OH (US)

(72) Inventors: Tingting Wang, ShangHai (CN); Fanbin Wang, ShangHai (CN); Bo Zhang, ShangHai (CN); Zhu Mao, ShangHai (CN); Shuyi Qin, ShangHai (CN); Qi Long, ShangHai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/188,611

(22) Filed: Nov. 13, 2018

(65) Prior Publication Data

US 2019/0191526 A1 Jun. 20, 2019

(30) Foreign Application Priority Data

Nov. 14, 2017 (CN) .......................... 201711122790.0

(51) Int. Cl.
*H05B 45/50* (2020.01)
*H01H 37/76* (2006.01)
(Continued)

(52) U.S. Cl.
CPC ............ *H05B 45/50* (2020.01); *H01H 37/76* (2013.01); *H05B 45/30* (2020.01); *H05B 45/37* (2020.01)

(58) Field of Classification Search
CPC H05B 33/0812; H05B 33/0809; H05B 45/37; H05B 45/345; H05B 33/0087;
(Continued)

(56) References Cited

U.S. PATENT DOCUMENTS 6,762,562 B2 7/2004 Leong
6,853,151 B2 2/2005 Leong et al.
(Continued)

FOREIGN PATENT DOCUMENTS

| CN | 103475238 A | 12/2013 |
|---|---|---|
| CN | 102595736 A | 9/2014 |
| CN | 106658811 A | 5/2017 |

OTHER PUBLICATIONS

Office Action Issued in connection with corresponding Chinese Application No. 201711122790.0 dated Jul. 15, 2020.

*Primary Examiner* — Amy Cohen Johnson
*Assistant Examiner* — Syed M Kaiser
(74) *Attorney, Agent, or Firm* — Buckley, Maschoff & Talwalkar LLC

(57) ABSTRACT

An LED lamp protection circuit comprising: a driving circuit, a rectifier circuit coupled with the driving circuit, an LED luminous component circuit coupled with the rectifier circuit, and an arcing protection circuit coupled between the rectifier circuit and the LED luminous component circuit. The arcing protection circuit and the LED luminous component circuit are connected in parallel. When the LED lamp works under a normal condition, the arcing protection circuit is in blocking state. When at least one circuit between the rectifier circuit and the LED luminous component circuit opens, the arcing protection circuit is turned on, the driving circuit and the arcing protection circuit form a loop circuit to extinguish arc.

9 Claims, 5 Drawing Sheets

(51) Int. Cl.
*H05B 45/37* (2020.01)
*H05B 45/30* (2020.01)

(58) Field of Classification Search
CPC ........ H05B 41/00; H05B 39/00; H05B 47/10; H05B 47/20; H05B 45/50; H01H 37/76
See application file for complete search history.

(56) References Cited

U.S. PATENT DOCUMENTS

| | | | |
|---|---|---|---|
| 7,053,557 B2 | 5/2006 | Cross | |
| 7,067,992 B2 | 6/2006 | Leong et al. | |
| 8,698,407 B1 * | 4/2014 | Chen | H05B 33/0812 315/185 R |
| 9,338,853 B2 | 5/2016 | Guang | |
| 9,420,663 B1 | 8/2016 | Hsia et al. | |
| 9,585,221 B1 * | 2/2017 | Chen | H05B 45/50 |
| 9,681,504 B1 * | 6/2017 | Barbosa | A01G 9/249 |
| 9,743,484 B2 | 8/2017 | Hsia | |
| 2008/0001551 A1 * | 1/2008 | Abbondanzio | H05B 35/00 315/291 |
| 2010/0295460 A1 * | 11/2010 | Lin | H05B 45/50 315/193 |
| 2011/0057572 A1 * | 3/2011 | Kit | H05B 45/37 315/185 R |
| 2011/0266961 A1 * | 11/2011 | Tsai | H05B 45/395 315/185 R |
| 2012/0169240 A1 * | 7/2012 | Macfarlane | H02M 1/4225 315/152 |
| 2012/0181946 A1 * | 7/2012 | Melanson | H05B 33/0845 315/247 |
| 2012/0181952 A1 * | 7/2012 | Roeer | H05B 33/0809 315/307 |
| 2013/0249431 A1 * | 9/2013 | Shteynberg | H05B 45/37 315/287 |
| 2013/0329473 A1 * | 12/2013 | Ren | H02H 7/1252 363/53 |
| 2014/0306750 A1 * | 10/2014 | Toyoda | H01L 23/5256 327/525 |
| 2014/0361623 A1 * | 12/2014 | Siessegger | H05B 33/0806 307/64 |
| 2015/0035449 A1 * | 2/2015 | Williams | H05B 33/0815 315/250 |
| 2015/0173138 A1 * | 6/2015 | Roberts | H05B 33/0809 315/201 |
| 2017/0019960 A1 * | 1/2017 | Qu | H05B 33/0827 |
| 2017/0171937 A1 * | 6/2017 | Hsia | H05B 33/0887 |
| 2017/0311397 A1 * | 10/2017 | Hsia | F21V 25/10 |
| 2017/0370534 A1 * | 12/2017 | Xiong | F21K 9/278 |
| 2018/0054056 A1 * | 2/2018 | Hu | H02J 3/18 |
| 2018/0192488 A1 * | 7/2018 | Hsia | H05B 33/0806 |
| 2019/0032864 A1 * | 1/2019 | Xiong | F21V 23/003 |
| 2019/0174596 A1 * | 6/2019 | Wen | |

* cited by examiner

LED LAMP PROTECTION CIRCUIT

TECHNICAL FIELD

The invention relates to the field of LED illumination, and in particular to a protection circuit for an LED lamp.

BACKGROUND

LED lighting has seen rapid growth in recent years owing to its energy efficiency, long service life, compact size, and environmental friendly advantages. The time to replace traditional incandescent and fluorescent lighting with LED lighting is here.

In the process of replacing a fluorescent lamp with an LED lamp, the electronic ballast of the fluorescent lamp is usually not replaced in order to save cost. Generally, it is required that the driving circuit of the LED lamp is able to take power from the output of the electronic ballast, thereby allowing the replacement of the LED lamp by simply removing the old fluorescent lamp. LED lamps nowadays are able to use the electronic ballast of the original fluorescent lamp as the driver of the LED lamp. When modifying the lamp, not only can this bypass the additional configuration of special LED drivers, but it also saves a lot of labor. This is especially true in expensive countries or regions.

Existing LED lamps generally comprise a lamp, a circuit board configured within the lamp and having a light source, and a cap configured at an end of the lamp. A power source is provided in the cap, the light source and the power source are electrically connected through the circuit board. However, there is sometimes poor soldering in the circuit board of the LED lamp or poor soldering between the light source of the LED lamp and the circuit board, which causes the LED lamp circuit to open. If the LED lamp circuit is open, the electronic ballast will generate a continuous high voltage at the point of the LED lamp circuit that is open, so that an arc, that is, an arcing phenomenon, is easily generated. The generated arc can easily cause the rectifier circuit of the LED lamp to be damaged. If the arc is significant, the high temperature generated may cause the circuit board of the LED lamp to be carbonized or overheat. In severe cases, it may emit smoke or even catch fire, which is a serious safety hazard (electric shock or fire) for the user.

Therefore, it is necessary to provide a novel protection circuit for an LED lamp which can solve at least one of the above-mentioned technical problems.

SUMMARY

An LED lamp protection circuit comprising: a driving circuit, a rectifier circuit coupled with the driving circuit, an LED luminous component circuit coupled with the rectifier circuit, and an arcing protection circuit coupled between the rectifier circuit and the LED luminous component circuit. The arcing protection circuit and the LED luminous component circuit are connected in parallel. When the LED lamp works at a normal condition, the arcing protection circuit is in blocking state; when the LED lamp is open, the arcing protection circuit is turned on, a loop circuit is formed between the driving circuit and the arcing protection circuit to extinguish arc.

BRIEF DESCRIPTION OF DRAWINGS

These and other features, aspects and advantages of the present invention will become better understood when the following detailed description is read with reference to the accompanying drawings, in which like reference numerals are used throughout the drawings to refer to like parts, where.

DETAILED DESCRIPTION OF EMBODIMENTS

Unless otherwise defined, technical terms or scientific terms used in the specification and claims shall be used in the ordinary meaning as understood by those having ordinary skill in the art to which the invention pertains. "First", "second", and similar words used herein do not denote any order, quantity, or importance, but are merely intended to distinguish between different constituents. The terms "one", "a" and similar words are not meant to be limiting, but rather denote the presence of at least one. The approximate language used herein can be used for quantitative expressions, indicating that there is a certain amount of variation that can be allowed without changing the basic functions. Therefore, the numerical values corrected by languages such as "approximately", "about" are not limited to the exact numerical value itself. Similarly, the terms "one", "a", and similar words are not meant to be limiting, but rather denote the presence of at least one. "Comprising", "consisting", and similar words mean that elements or articles appearing before "comprising" or "consisting" include the elements or articles and their equivalent elements appearing behind "comprising" or "consisting", not excluding any other elements or articles. "Connected", "connection", "coupled", and similar words are not limited to a physical or mechanical connection, but may include direct or indirect electrical connections, thermal connections, thermally conductive connections, and thermally transmissive connections.

The present invention relates to a protection circuit for an LED lamp, in particular to a protection circuit for an LED lamp driven by an electronic ballast.

Figure 1:
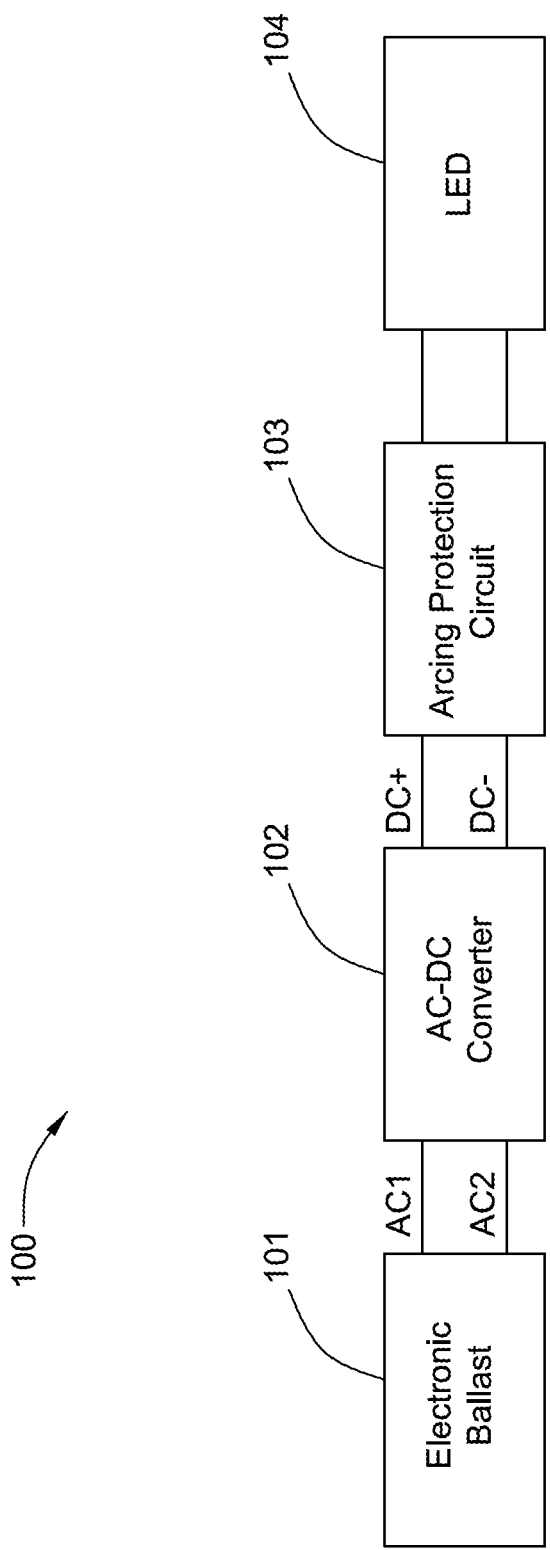
FIG. 1 is a schematic diagram of a protection circuit for an LED lamp according to an embodiment of the present invention.

Please refer to FIG. 1, which is a schematic diagram of a protection circuit 100 of an LED lamp according to an embodiment of the present invention, which comprises a driving circuit 101, a rectifier circuit 102 coupled to the driving circuit 101, an LED luminous component circuit 104 coupled to the rectifier circuit 102, and an arcing protection circuit 103 coupled between the rectifier circuit 102 and the LED luminous component circuit 104.

The driving circuit 101 is for driving an LED lamp, which can be used to receive an AC voltage from an AC power source and convert it into a high frequency AC voltage as a drive voltage of the rectifier circuit 102. The driving circuit 101 can be an electronic ballast for converting the grid voltage into a high frequency, high voltage AC voltage. The electronic ballast can be a common electronic ballast, such as an instant-start electronic ballast, a programmed-start electronic ballast, a rapid-start electronic ballast, and so on. The protection circuit of the LED lamp is applicable to various types of electronic ballasts, and is not limited to the types of electronic ballasts mentioned above. The driving circuit 101 can be connected to one or both ends of the LED lamp through pins (not shown) of the LED lamp to transmit AC power to the rectifier circuit 102.

The rectifier circuit 102 comprises an AC-DC converter, which is a full wave bridge rectifier circuit. The rectifier circuit may comprise four or more separate silicon diodes or a bridge assembly. The rectifier circuit 102 is configured to adjust a voltage of the LED luminous component circuit 104, and convert the high frequency alternating current outputted by the driving circuit 101 into a direct current. The DC voltage positive output terminal and the DC voltage negative output terminal of the rectifier circuit 102 are coupled to both ends of the LED luminous assembly circuit 104 separately to provide an adjusted voltage and current required to drive the LED luminous component circuit 104.

The arcing protection circuit 103 is coupled between the rectifier circuit 102 and the LED luminous component circuit 104. An input terminal of the arcing protection circuit 103 is connected to a DC voltage output terminal of the rectifier circuit 102, the output terminal is connected to the LED luminous component circuit 104. When the LED lamp works under a normal condition, the arcing protection circuit 103 is in blocking state and does not function; when the LED lamp circuit is open, the arcing protection circuit 103 is turned on, a loop circuit is formed between the driving circuit 102 and the arcing protection circuit 103 to extinguish arc.

The LED luminous component circuit 104 comprises a light emitting diode assembly, which comprises a plurality of light emitting diodes connected in series.

Figure 2:
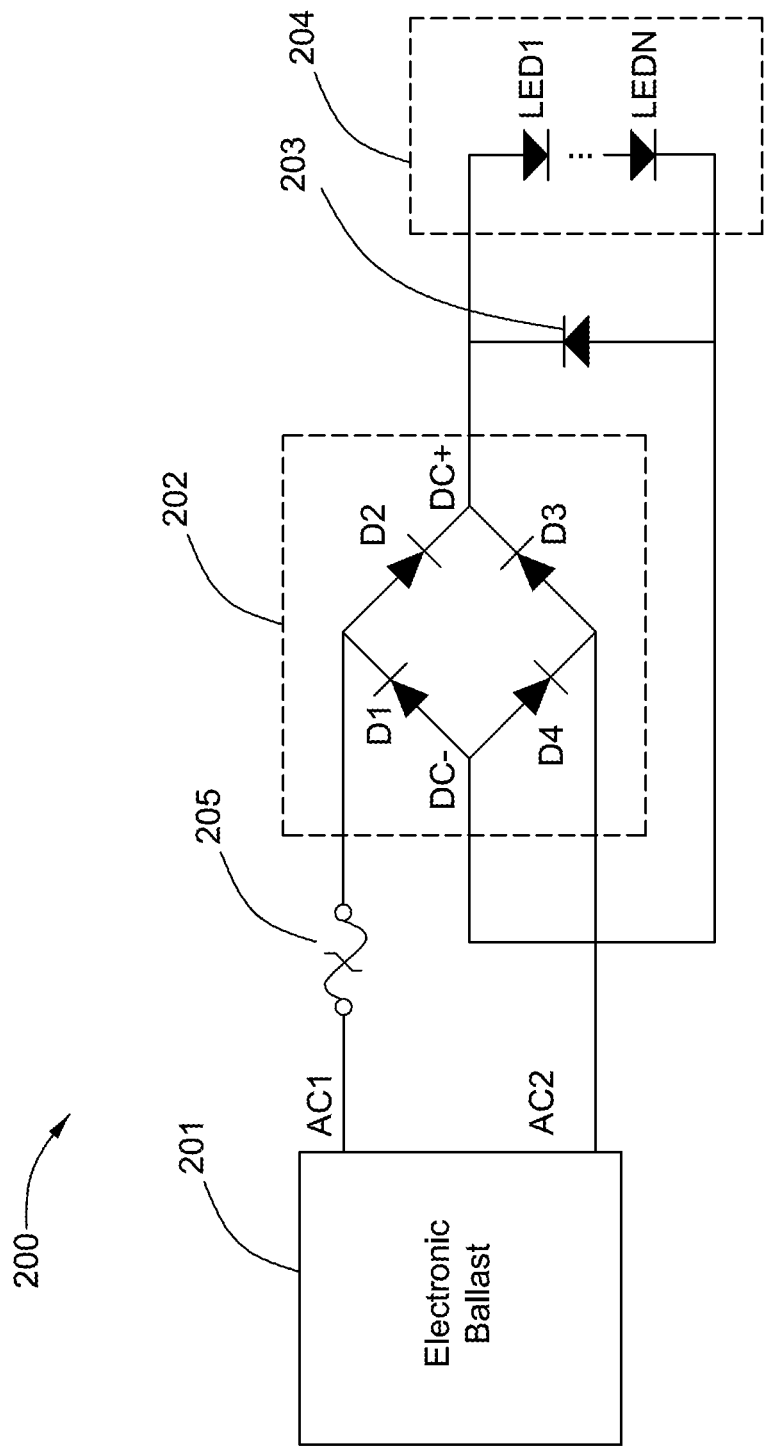
FIG. 2 is a circuit diagram of a protection circuit of an LED lamp according to an embodiment of the present invention.

Please refer to FIG. 2, which is a circuit diagram of a protection circuit 200 for an LED lamp according to an embodiment of the present invention. The protection circuit 200 of the LED lamp shown in FIG. 2 comprises a driving circuit 201, a rectifier circuit 202 coupled to the driving circuit 201, an LED luminous component circuit 204 coupled to the rectifier circuit 202, and the arcing protection circuit 203 coupled between the rectifier circuit 202 and the LED luminous component circuit 204.

The driving circuit 201 is similar in structure and function to the driving circuit 101 in FIG. 1, and its details are not described herein. The driving circuit 201 comprises an electronic ballast that can be used to convert an alternating voltage of an alternating current source into a high frequency alternating voltage.

The rectifier circuit 202 comprises an AC-DC converter, which is a full-wave bridge rectifier circuit comprising a rectifier diode D1, a rectifier diode D2, a rectifier diode D3, and a rectifier diode D4. The rectifier circuit 203 is configured to adjust a voltage across the LED luminous component circuit 204 to convert the high frequency alternating current output by the driving circuit 201 into a DC current required by the LED lighting component circuit 204. The input terminals of the rectifier circuit 202 are respectively connected to the AC voltage first input terminal AC1 and the AC voltage second input terminal AC2 of the driving circuit 201. The output terminals of the rectifier circuit 202 comprise a DC voltage positive output terminal DC+ and a DC voltage negative output terminal DC−, which are respectively connected to the arcing protection circuit 203 and the two terminals of the LED luminous component circuit 204. The rectifier circuit 202 of this embodiment is only an example. The number of rectifier diodes is not limited by this embodiment and may adjusted according to the needs of the circuit.

The arcing protection circuit 203 and the LED luminous component circuit 204 are connected in parallel. The arcing protection circuit 203 comprises a reverse diode, whose negative pole is connected to the DC voltage positive output terminal DC+ of the rectifier circuit 202, and whose anode is connected to the DC voltage negative output terminal DC− of the rectifier circuit 202. Under normal conditions, the reverse diode is not turned on because its reverse conducting voltage is greater than the operating voltage of the LED luminous component circuit 204. The reverse diode is turned on only when the voltage reaches or exceeds the reverse conducting voltage of the reverse diode, and a loop circuit is formed between the driving circuit 201 and the arcing protection circuit 203 to eliminate arc.

The LED luminous component circuit 204 comprises a light-emitting diode component, which comprises a plurality of light-emitting diodes LED1 to LEDN connected in series.

The protection circuit 200 of the LED lamp further comprises a non-resettable thermal fuse 205 configured between the driving circuit 201 and the rectifier circuit 202. The non-resettable thermal fuse 205 may be configured at the AC voltage first output terminal AC1 or the AC voltage second output terminal AC2 of the driving circuit 201. In this embodiment, the non-resettable thermal fuse 205 is configured at the first output terminal AC1 of the AC voltage of the driving circuit 201, one terminal thereof is connected to the AC output first output terminal AC1, and the other terminal thereof is connected to an input terminal of the rectifier circuit 202.

When the LED lamp works under a normal condition, the arcing protection circuit 203 is in blocking state and does not function, a loop circuit is formed between the driving circuit 201 and the LED luminous component 204, the LEDs of LED1 to LEDN are illuminated, and the LED lamp is able to function as normal. When the LED lamp circuit is open, the arcing protection circuit 203 will function, which will be turned on by the high voltage generated by the driving circuit 201, forming a loop circuit between the driving circuit 202 and the arcing protection circuit 203; to avoid continuous high voltage in the entire circuit, it can eliminate the arc and provide arcing protection. After the arcing protection circuit has functioned, the non-resettable thermal fuse 205 is blown by the high temperature generated by the arcing protection circuit 203 to prevent the entire LED lamp from continuing high voltage and high temperature, thereby further protecting the entire circuit of the LED lamp and eliminating potential safety hazards.

Figure 3:
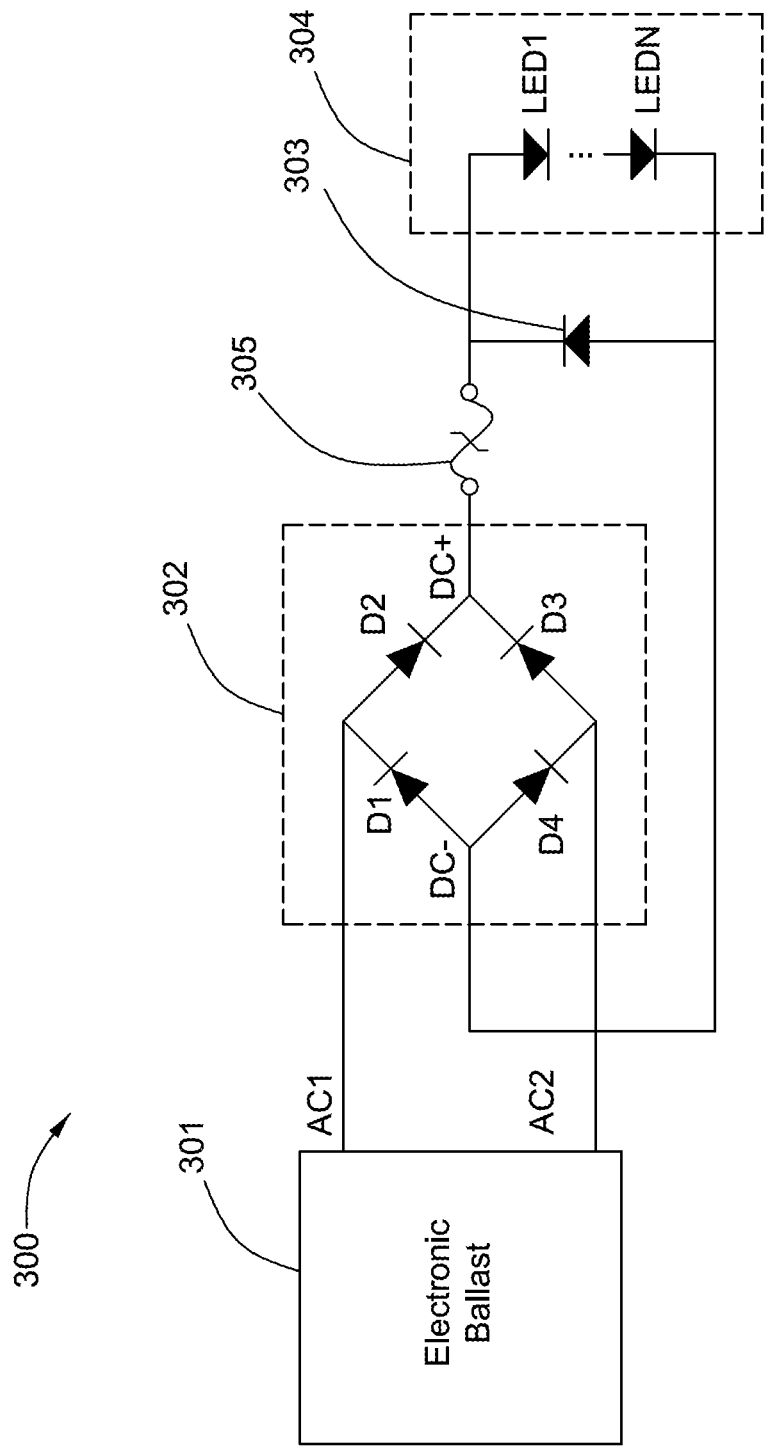
FIG. 3 is a circuit diagram of a protection circuit of an LED lamp according to an embodiment of the present invention.

Please refer to FIG. 3, which is a circuit diagram of a protection circuit 300 for an LED lamp according to an embodiment of the present invention. The protection circuit 300 of the LED lamp shown in FIG. 3 also comprises a driving circuit 301, a rectifier circuit 302 coupled to the driving circuit 301, an LED luminous component circuit 304 coupled to the rectifier circuit 302, and an arcing protection circuit 303 coupled between the rectifier circuit 302 and the LED luminous component circuit 304.

The protection circuit of the LED lamp shown in FIG. 3 is similar to the protection circuit of the LED lamp shown in FIG. 2, and its details are not described herein. The arcing protection circuit 303 shown in FIG. 3 also comprises a reverse diode, which is similar to the reverse diode of the arcing protection circuit 203 shown in FIG. 2, and its details are also not described again. The protection circuit of the LED lamp shown in FIG. 3 is different from the protection circuit of the LED lamp shown in FIG. 2, in that the location of connection of the non-resettable thermal fuse 305 of the protection circuit of the LED lamp is different from that of the non-resettable thermal fuse 205 as shown in FIG. 2. The non-resettable thermal fuse 305 of FIG. 3 is placed at the DC voltage output terminal of the rectifier circuit 302, one end of which is connected to the DC voltage positive output terminal DC+ of the rectifier circuit 302, while the other end of which is connected to the negative terminal of the reverse diode.

The protection circuit of the LED lamp shown in FIG. 3 and the protection circuit of the LED lamp shown in FIG. 2 are similar in operation. When the LED lamp works under a normal condition, the arcing protection circuit 303 is in blocking state and does not function, a loop circuit is formed between the driving circuit 301 and the LED luminous component 304, the LEDs of LED1 to LEDN are illuminated, and the LED lamp is able to function as normal. When the LED lamp circuit is open, the arcing protection circuit 303 will function, which will be turned on by the high voltage generated by the driving circuit 301, forming a loop circuit between the driving circuit 302 and the arcing protection circuit 303; to avoid continuous high voltage in the entire circuit, it can eliminate the arc and provide arcing protection. After the arcing protection circuit 303 has functioned, the non-resettable thermal fuse 305 is blown by the high temperature generated by the arc protection circuit 303 to prevent the entire LED lamp from continuing high voltage and high temperature, thereby further protecting the entire circuit of the LED lamp and eliminating potential power safety hazards.

Figure 4:
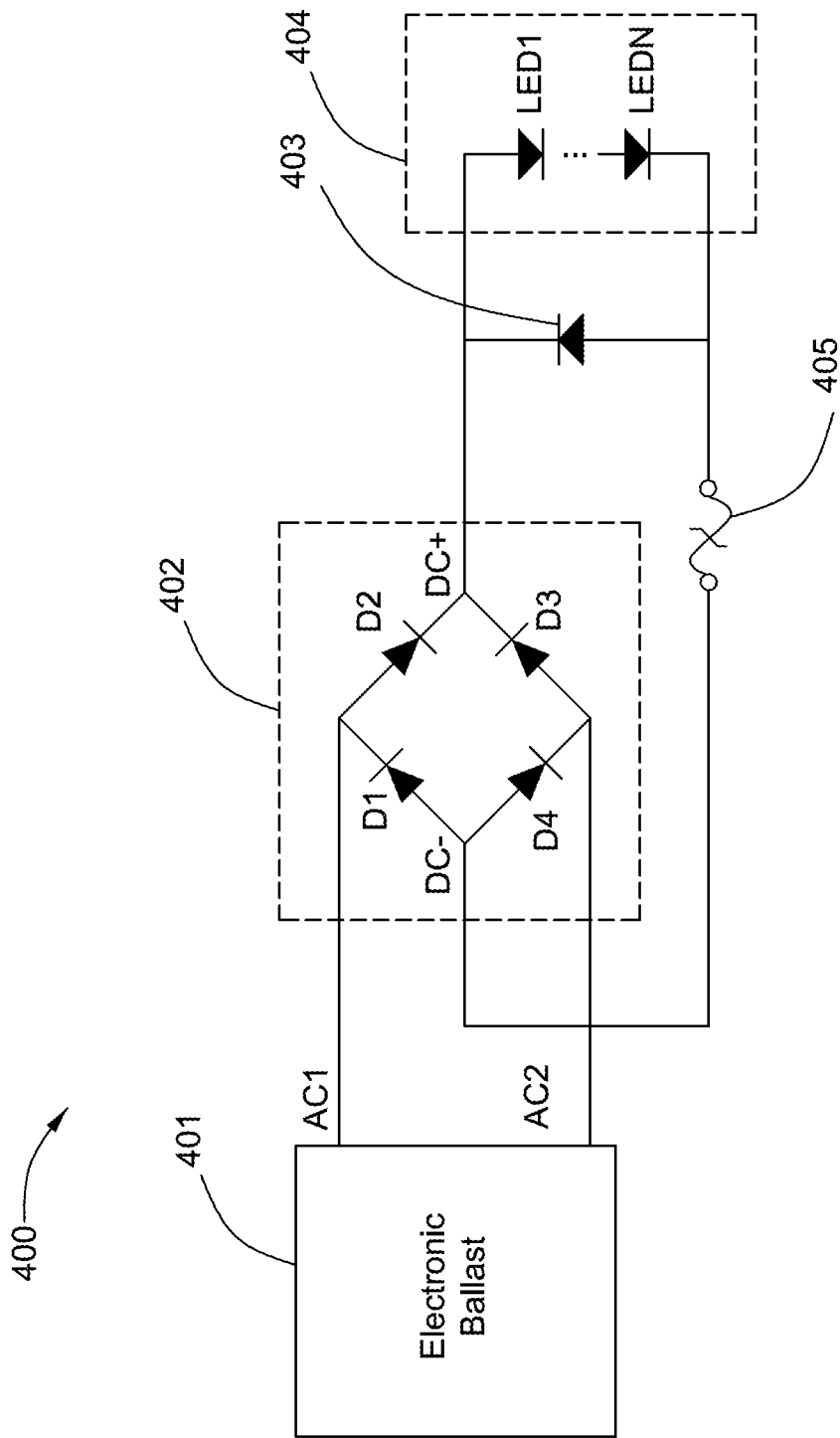
FIG. 4 is a circuit diagram of a protection circuit of an LED lamp according to an embodiment of the present invention.

Please refer to FIG. 4, which is a circuit diagram of a protection circuit 400 for an LED lamp according to an embodiment of the present invention. The protection circuit 400 of the LED lamp shown in FIG. 4 also comprises a driving circuit 401, a rectifier circuit 402 coupled to the driving circuit 401, an LED luminous component circuit 404 coupled to the rectifier circuit 402, and an arcing protection circuit 403 coupled between the rectifier circuit 402 and the LED luminous component circuit 404.

The protection circuit of the LED lamp shown in FIG. 4 is similar to the protection circuit of the LED lamp shown in FIG. 2 and FIG. 3, and its details are not described herein. The arcing protection circuit 403 shown in FIG. 4 also comprises a reverse diode, which is similar to the reverse diode of the arcing protection circuit shown in FIGS. 2 and 3, and its details are not described herein. The protection circuit of the LED lamp shown in FIG. 4 is different from the protection circuit of the LED lamp shown in FIG. 2 and FIG. 3, in that the non-resettable thermal fuse 405 of the protection circuit of the LED lamp is connected to a different location as the non-resettable thermal fuses as shown in FIG. 2 and FIG. 3. The non-resettable thermal fuse 405 as shown in FIG. 4 is placed at the DC voltage negative output terminal of the rectifier circuit 402, one end of which is connected to the DC voltage negative output terminal DC− of the rectifier circuit 402, while the other end of which is connected to the positive terminal of the reverse diode.

The protection circuit of the LED lamp shown in FIG. 4 and the protection circuit of the LED lamp shown in FIGS. 2 and 3 are similar in operation. When the LED lamp works under a normal condition, the arcing protection circuit 403 is in blocking state and does not function, a loop circuit is formed between the driving circuit 401 and the LED luminous component 404, the LEDs of LED1 to LEDN are illuminated, and the LED lamp is able to function as normal. When the LED lamp circuit is open, the arcing protection circuit 403 will function, which will be turned on by the high voltage generated by the driving circuit 401, forming a loop circuit between the driving circuit 402 and the arcing protection circuit 403; to avoid continuous high voltage in the entire circuit, it can eliminate the arc and provide arcing protection. After the arcing protection circuit 403 has functioned, the non-resettable thermal fuse 405 is blown by the high temperature generated by the arc protection circuit 403 to prevent the entire LED lamp from continuing high voltage and high temperature, thereby further protecting the entire circuit of the LED lamp and eliminating potential power safety hazards.

Figure 5:
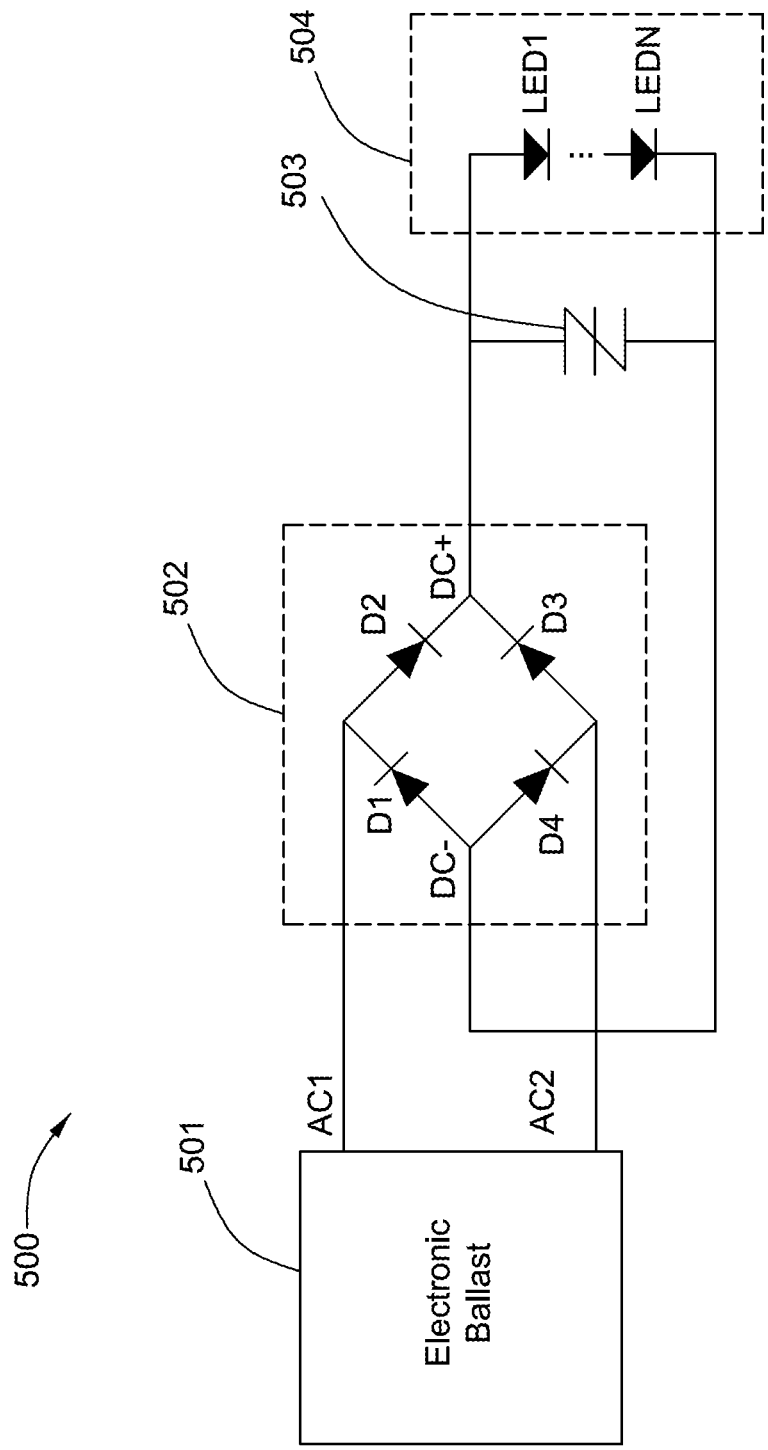
FIG. 5 is a circuit diagram of a protection circuit of an LED lamp according to an embodiment of the present invention.

FIG. 5 is a circuit diagram of a protection circuit 500 for an LED lamp according to an embodiment of the present invention. The protection circuit 500 of the LED lamp shown in FIG. 5 also comprises a driving circuit 501, a rectifier circuit 502 coupled to the driving circuit 501, an LED luminous component circuit 504 coupled to the rectifier circuit 502, and an arcing protection circuit 503 coupled between the rectifier circuit 502 and the LED luminous component circuit 504.

The protection circuit of the LED lamp shown in FIG. 5 is similar to the protection circuit of the LED lamp shown in FIG. 2 to FIG. 4, and its details are not described herein. The protection circuit of the LED lamp shown in FIG. 5 differs from the protection circuit of the LED lamp shown in FIGS. 2 to 4, in that the arcing protection circuit 503 comprises a bidirectional voltage protection element. In this embodiment, the bidirectional voltage protection component may comprise a silicon diode for alternating current (SIDAC). In the present invention, the bidirectional voltage protection element is not limited to those enumerated in this embodiment, and may also comprise other types of bidirectional voltage protection elements. The bidirectional voltage protection element and the LED luminous component circuit 504 are connected in parallel. At the same time, one end of the bidirectional voltage protection element is connected to the DC voltage positive output terminal DC+ of the rectifier circuit 502, while the other end is connected to the DC voltage negative output terminal DC− of the rectifier circuit 502. Under a normal condition, the silicon diode for alternating current (SIDAC) is not turned on because its turn-on threshold voltage is greater than the operating voltage of the LED luminous component circuit 504. The silicon diode for alternating current (SIDAC) is turned on only when the voltage reaches or exceeds the turn-on voltage threshold of the silicon diode for alternating current (SIDAC), a loop circuit is formed between the driving circuit 501 and the arcing protection circuit 503 to eliminate the arc and potential electrical safety hazards.

When the LED lamp works under a normal condition, the arcing protection circuit 503 is in blocking state and does not function, that is, the silicon diode for alternating current (SIDAC) is in blocking state, a loop circuit is formed between the driving circuit 501 and the LED luminous component circuits 504, the LEDs of LED1 to LEDN are illuminated, and the LED lamp is able to function as normal. When the LED lamp circuit is open, the arc protection circuit 503 will function, that is, the silicon diode for alternating current (SIDAC) will be turned on by the high voltage generated by the driving circuit 501, a loop circuit is formed between the driving circuit 501 and the arcing protection circuit 503 to prevent the entire circuit from continuing to have a high voltage, thereby eliminating the arc and providing arc protection, eliminating potential power safety hazards.

The description uses specific embodiments to describe the present invention, including the best mode, and can help any person skilled in the art perform experimental operations. These operations include using any device and system and using any specific method. The patentable scope of the present invention is defined by the claims, and may include other examples that occur in the art. Other examples are considered to be within the scope of the claims of the invention if they are not structurally different from the literal language of the claims or they have equivalent structures as described in the claims.

The invention claimed is:

1. A LED lamp protection circuit comprising:
a driving circuit;
a rectifying circuit coupled with the driving circuit;
an LED luminous component circuit coupled with the rectifying circuit;
an arcing protection circuit coupled between the rectifying circuit and the LED luminous component circuit, and connected in parallel to the LED luminous component circuit, wherein the arcing protection circuit comprises a reverse diode; and
a non-resettable thermal fuse coupled between the rectifying circuit and the reverse diode, the non-resettable thermal fuse to be blown in the event of a high temperature generated by the arcing protection circuit;
wherein one end of the non-resettable thermal fuse is connected to a first DC voltage output terminal of the rectifying circuit, the other end of the non-resettable thermal fuse is connected to a first terminal of the reverse diode, and a second terminal of the reverse diode is connected to a second DC voltage output terminal of the rectifying circuit;
wherein the arcing protection circuit is in a blocking state when the LED lamp works at a normal condition, and the arcing protection circuit switches on, and the driving circuit and the arcing protection circuit form a loop circuit to extinguish arc when at least one circuit between the rectifying circuit and the LED luminous component circuit opens.

2. The LED lamp protection circuit of claim 1, wherein an anode of the reverse diode is coupled to a DC voltage negative output terminal of the rectifying circuit, and a cathode of the reverse diode is coupled to a DC voltage positive output terminal of the rectifying circuit.

3. The LED lamp protection circuit of claim 1, wherein the first DC voltage output terminal is a DC voltage positive output terminal of the rectifying circuit, wherein the first terminal of the reverse diode is a cathode of the reverse diode, wherein the second terminal of the reverse diode is an anode of the reverse diode, and wherein the second DC voltage output terminal is a DC voltage negative output terminal of the rectifying circuit.

4. The LED lamp protection circuit of claim 1, wherein the first DC voltage output terminal is a DC voltage negative output terminal of the rectifying circuit, wherein the first terminal of the reverse diode is an anode of the reverse diode, wherein the second terminal of the reverse diode is a cathode of the reverse diode, and wherein the second DC voltage output terminal is a DC voltage positive output terminal of the rectifying circuit.

5. The LED lamp protection circuit of claim 1, wherein the arcing protection circuit comprises a bidirectional voltage protection element.

6. The LED lamp protection circuit of claim 5, wherein the bidirectional voltage protection element comprises a silicon diode for alternating current (SIDAC).

7. The LED lamp protection circuit of claim 5, wherein one end of the bidirectional voltage protection element is connected to a DC voltage positive output terminal of the rectifying circuit, the other end of the bidirectional voltage protection element is connected to a DC voltage negative output terminal of the rectifying circuit.

8. A LED lamp protection circuit comprising:
a driving circuit;
a rectifying circuit coupled with the driving circuit;
an LED luminous component circuit coupled with the rectifying circuit; and
an arcing protection circuit coupled between the rectifying circuit and the LED luminous component circuit, and connected in parallel to the LED luminous component circuit,
wherein the arcing protection circuit comprises a reverse diode, and the LED lamp protection circuit comprises a non-resettable thermal fuse coupled between the rectifying circuit and the reverse diode;
wherein the arcing protection circuit is in a blocking state when the LED lamp works at a normal condition, and the arcing protection circuit switches on, and the driving circuit and the arcing protection circuit form a loop circuit to extinguish arc when at least one circuit between the rectifying circuit and the LED luminous component circuit opens;
wherein one end of the non-resettable thermal fuse is connected to a DC voltage positive output terminal of the rectifying circuit, the other end of the non-resettable thermal fuse is connected to a cathode of the reverse diode, and an anode of the reverse diode is connected to a DC voltage negative output terminal of the rectifying circuit.

9. A LED lamp protection circuit comprising:
a driving circuit;
a rectifying circuit coupled with the driving circuit;
an LED luminous component circuit coupled with the rectifying circuit; and
an arcing protection circuit coupled between the rectifying circuit and the LED luminous component circuit, and connected in parallel to the LED luminous component circuit,
wherein the arcing protection circuit comprises a reverse diode, and the LED lamp protection circuit comprises a non-resettable thermal fuse coupled between the rectifying circuit and the reverse diode;
wherein the arcing protection circuit is in blocking state when the LED lamp works at a normal condition, and the arcing protection circuit switches on, and the driving circuit and the arcing protection circuit form a loop circuit to extinguish arc when at least one circuit between the rectifying circuit and the LED luminous component circuit opens;
wherein one end of the non-resettable thermal fuse is connected to a DC voltage positive output terminal of the rectifying circuit, the other end of the non-resettable thermal fuse is connected to a cathode of the reverse diode, and an anode of the reverse diode is connected to a DC voltage negative output terminal of the rectifying circuit; and
wherein the non-resettable thermal fuse is blown by a high temperature generated by the arcing protection circuit after the arcing protection circuit switches on.

* * * * *